3,386,997
2 - (3 - HYDROXY - 5 - HYDROXYMETHYL - 2 - METHYL - 4 - PYRIDYL)-TETRAHYDRO - 1,3 - THIAZINE-4-CARBOXYLIC ACID AND THE PREPARATION THEREOF
Kentaro Okumura, Minami-machi, Kobe-shi, Keiji Kodera, Itami-shi, Toji Nishihara, Sakai-shi, and Tatsuo Oda, Osaka-shi, Japan, assignors to Tanabe Seiyaku Co., Ltd., Osaka, Japan, a corporation of Japan
No Drawing. Filed Dec. 30, 1965, Ser. No. 517,852
Claims priority, application Japan, Jan. 12, 1965, 40/1,699
1 Claim. (Cl. 260—243)

---

ABSTRACT OF THE DISCLOSURE

The invention consists in the compound 2-(3-hydroxy-5-hydroxymethyl - 2 - methyl-4-pyridyl)-tetrahydro-1,3-thiazine-4-carboxylic acid. The compound has not only the activity of both vitamin $B_6$ and homocysteine, but also their synergistic activity, particularly for the prevention of hypohepatia such as hepatitis, serum hepatitis or hepatocirrhosis.

---

This invention relates to a new chemical compound designated as 2-(3-hydroxy-5-hydroxymethyl-2-methyl-4-pyridyl)-tetrahydro-1,3-thiazine-4-carboxylic acid and the process for preparing the same.

The compound may be illustrated by the following formula:

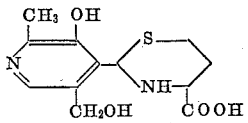

We have found that the compound has not only the activity of both vitamin $B_6$ and homocysteine, but also their synergistic activity, particularly for the prevention of hypohepatia such as heaptitis, serum hepatitis or hepatocirrhosis, whereas the toxicity of the compound is remarkably lower than pyridoxal phosphate or pyridoxine hydrochloride.

The compound of this invention is almost as effective for treatment of vitamin $B_6$ deficiency symptoms in animals and humans as pyridoxine hydrochloride or pyridoxal phosphate at doses on an equimolar basis. The compound also prevents poisoning of animals and humans at almost the same doses as homocysteine on an equimolar basis. Furthermore, the compound of this invention shows the synergistic effect of pyridoxal and homocysteine on animal and human liver functions such as the elimination of foreign substances. For example, the product of this invention was more effective in preventing the depression in Bromosulphalein elimination of rats suffering from hypohepatia as compared to pyridoxal hydrochloride or homocysteine.

The compound of the present invention may be prepared by the method represented by the following equation:

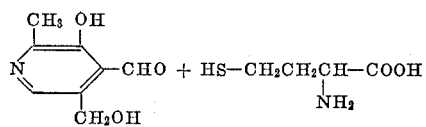

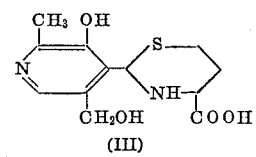

The reaction can be conveniently carried out by mixing pyridoxal and homocysteine in an aqueous solvent and standing the mixture for a length of time, preferably at pH about 4 to 5 at room temperature. Alternatively, the reaction can be carried out by dissolving acid addition salt of homocysteine thiolactone such as the hydrochloride in an alkaline solution such as aqueous sodium hydroxide or potassium hydroxide, preferably at about 30–40° C. under an inert gas atmosphere, to isolate homocysteine in the solution and admixing pyridoxal into the solution.

The final product (III) can be recovered from the reaction mixture in the conventional manner. For example, the product may be easily crystallized out by cooling the reaction mixture at a slightly acidic pH.

In the foregoing reactions, pyridoxal can be replaced with its betaine sulfonic acid {(3-hydroxy-5-hydroxymethyl - 2 - methyl-4-pyridyl)-hydroxymethane-sulfonic acid} or its acid addition salt such as the hydrochloride. The oxidation mixture of pyridoxine or the reaction mixture of pyridoxal oxime with nitrous acid in which pyridoxal was formed can also be employed as the starting material.

EXPERIMENT

Vitamin $B_6$ derivatives tabulated in Table I were administered orally to Wister-King male rats of 200–250 g. at doses equimolar in amount to 5 mg. of pyridoxal hydrochloride/kg./day for 5 days.

0.5 mg./kg. of carbon tetrachloride was injected subcutaneously to each of the rats as 10% solution in olive oil. After 30 hours starvation, 25 mg./kg. of Bromosulphalein was injected intravenously to each of the rats and the secretion of Bromosulphalein into bilis was followed.

The percentages of Bromosulphalein secreted in bilis per injected Bromosulphalein were calculated in each case and the results are tabulated in Table I.

TABLE I

| Vitamin $B_6$ derivative | Number of rats | Time after Bromosulphalein injection | | | | |
|---|---|---|---|---|---|---|
| | | 30 min. | 45 min. | 1 hr. | 1.5 hrs. | 2 hrs. |
| CCl$_4$ hypohepatia group: | | | | | | |
| Pyridoxal-DL-homocysteine condensate of this invention | 5 | 24.0 | 46.0 | 65.0 | 76.3 | 90.5 |
| Pyridoxal hydrochloride | 4 | 23.0 | 41.0 | 55.0 | 70.5 | 80.0 |
| Homocysteine | 5 | 23.5 | 40.0 | 60.5 | 72.3 | 80.0 |
| None | 5 | 23.0 | 37.0 | 50.5 | 62.0 | 78.0 |
| Normal | | 25.0 | 45.5 | 66.0 | 80.6 | 92.5 |

On the other hand, the acute toxicity in mice of the compound of this invention was remarkably lower than pyridoxal phosphate and pyridoxine hydrochloride as illustrated in Table II.

TABLE II

| Vitamin $B_6$ derivative | $LD_{50}$ (mg./kg.) | | |
| --- | --- | --- | --- |
|  | Intravenous | Subcutaneous | Oral |
| Pyridoxal-DL-homocysteine condensate of this invention | >1,500 | 3,005 (2,550-35,410) | ca. 10,000 |
| Pyridoxal phosphate | 240 (210-270) | 550 (380-700) | >3,000 |
| Pyridoxine hydrochloride | 400 (340-470) | 1,900 (1,710-2,130) | >3,000 |

Example 1

2.03 g. of pyridoxal hydrochloride, 1.35 g. of DL-homocysteine and 2.72 g. of sodium acetate trihydrate were dissolved in 8 ml. of water while heating. After filtering the mixture, the resultant filtrate was allowed to stand for one hour at room temperature, whereby colorless needles crystallized out.

The crystals were collected by filtration and the mother liquor was concentrated to give additional crystals. The crystals were combined, washed with cold water and acetone successively, and dried.

Thus, 2.3 g. of 2-(3-hydroxy-5-hydroxymethyl-2-methyl-4-pyridyl)-tetrahydro-1,3-thiazine-4-carboxylic acid was obtained.

M.P. 152–153° C. (decomp.). Yield 76%.

Analysis calculated for $C_{12}H_{16}O_4N_2S$: C, 50.68; H, 5.67; N, 9.86; S, 11.28. Found: C, 50.74; H, 5.39; N, 9.70; S, 11.08.

Infrared absorption maxima (in Nujol): 3250, 2000–2700, 1732, 1635, 1610, 1590, 1520, 1460 and 1410 cm.$^{-1}$.

Ultraviolet absorption maxima (in water at pH 7.5): 324, 253 and 222 mu.

Nuclear magnetic resonance value (in dimethylsulfoxide):
2.05$^\tau$ (pyridine α-H)
4.46$^\tau$ (thiazane 2-H)

Example 2

2.5 g. of betaine sulfonic acid of pyridoxal, 1.35 g. of DL-homocysteine and 2.72 g. of sodium acetate trihydrate were dissolved in 6 ml. of water. The mixture was allowed to stand for one hour in an ice box, whereby colorless needles crystallized out.

The crystals were filtered and washed with cold water and acetone, successively. Thus, 2.15 g. of 2-(3-hydroxy-5-hydroxymethyl-2-methyl-4-pyridyl)-tetrahydro-1,3-thiazine-4-carboxylic acid was obtained. M. P. 152–153° C. (decomp.). Yield, 71%.

The absorption maxima in infrared and ultraviolet regions, Nuclear Magnetic Resonance value of the product were identical with the compound produced in Example 1.

Example 3

63 g. of 95% sodium hydroxide was dissolved in 380 ml. of water, 77 g. of DL-homocysteine thiolactone hydrochloride was added to the solution at 30 to 40° C. under nitrogen atmosphere. After standing for 30 minutes at room temperature, 60 g. of acetic acid and 102 g. of pyridoxal hydrochloride were added to the solution. The mixture was stirred for 30 minutes and the resultant clear orange solution was allowed to stand for 4 hours under cooling, whereby 107.7 g. of fine needles crystallized out. Yield, 75%.

The crystal was recrystallized from water, washed with acetone and dried over phosphorous pentoxide at 50° C. under reduced pressure. Thus, 63.5 g. of 2-(3-hydroxy-5-hydroxymethyl-2-methyl-4-pyridyl)-tetrahydro-1,3-thiazine-4-carboxylic acid monohydrate was obtained. M. P. 135–138° C. (decomp.). Yield, 44%.

What is claimed is:
1. 2-(3-hydroxy-5-hydroxymethyl-2-methyl-4-pyridyl)-tetrahydro-1,3-thiazine-4-carboxylic acid.

References Cited

UNITED STATES PATENTS 3,314,951   4/1967   Wolf _____ 260—243

JOHN D. RANDOLPH, *Primary Examiner.*

WALTER A. MODANCE, *Examiner.*

J. M. FORD, *Assistant Examiner.*